US010362143B2

(12) United States Patent
Baldwin et al.

(10) Patent No.: US 10,362,143 B2
(45) Date of Patent: *Jul. 23, 2019

(54) DYNAMICALLY TRANSITIONING THE FILE SYSTEM ROLE OF COMPUTE NODES FOR PROVISIONING A STORLET

(71) Applicant: International Business Machines Corporation, Armonk, NY (US)

(72) Inventors: Duane M. Baldwin, Mantorville, MN (US); Sasikanth Eda, Andhra pradesh (IN); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/279,519

(22) Filed: Sep. 29, 2016

(65) Prior Publication Data

US 2018/0091626 A1 Mar. 29, 2018

(51) Int. Cl.
*G06F 15/16* (2006.01)
*H04L 29/08* (2006.01)
*H04L 29/06* (2006.01)

(52) U.S. Cl.
CPC .............. *H04L 67/34* (2013.01); *H04L 67/10* (2013.01); *H04L 67/42* (2013.01)

(58) Field of Classification Search
None
See application file for complete search history.

(56) References Cited

U.S. PATENT DOCUMENTS

| 7,676,552 | B2 | 3/2010 | Eilam et al. |
| 8,209,417 | B2 | 6/2012 | Kakarla et al. |
| 8,886,705 | B1 | 11/2014 | Tewari et al. |
| 9,501,493 | B1 * | 11/2016 | Banerjee ............... G06F 16/188 |

(Continued)

FOREIGN PATENT DOCUMENTS

WO 2008006196 A2 1/2008

OTHER PUBLICATIONS

IBM Knowledge Center, "Introduction: Token Management and the role of the metanode", accessed at https://www.ibm.com/developerworks/community/wikis/home?lang=#!/wiki/General%20Parallel%20File%20System%20%28GPFS%29/page/Token%20Management, Sep. 24, 2014.

(Continued)

*Primary Examiner* — Dhairya A Patel
(74) *Attorney, Agent, or Firm* — Martin & Associates, LLC; Bret J. Petersen

(57) ABSTRACT

A system and method dynamically transitions the file system role of compute nodes in a distributed clustered file system for an object that includes an embedded compute engine (a storlet). Embodiments of the invention overcome prior art problems of a storlet in a distributed storage system with a storlet engine having a dynamic role module which dynamically assigns or changes a file system role served by the node to a role which is more optimally suited for a computation operation in the storlet. The role assignment is made based on a classification of the computation operation and the appropriate filesystem role that matches computation operation. For example, a role could be assigned which helps reduce storage needs, communication resources, etc.

18 Claims, 8 Drawing Sheets

(56) References Cited

U.S. PATENT DOCUMENTS

| | | | | |
|---|---|---|---|---|
| 9,740,705 | B2* | 8/2017 | Banerjee | G06F 16/182 |
| 2009/0248737 | A1* | 10/2009 | Shukla | G06F 9/44 |
| 2012/0089786 | A1* | 4/2012 | Pruthi | G06F 12/0831 |
| | | | | 711/141 |
| 2012/0102137 | A1* | 4/2012 | Pruthi | G06F 12/0813 |
| | | | | 709/213 |
| 2012/0192152 | A1 | 6/2012 | Oberlin et al. | |
| 2013/0080603 | A1* | 3/2013 | Simons | H04L 67/16 |
| | | | | 709/220 |
| 2013/0166677 | A1* | 6/2013 | Chung | G06F 9/542 |
| | | | | 709/217 |
| 2013/0185414 | A1 | 7/2013 | Puttaswamy Naga | |
| 2014/0317620 | A1 | 10/2014 | Farkas et al. | |
| 2015/0235044 | A1 | 8/2015 | Cohen et al. | |
| 2015/0281398 | A1 | 10/2015 | Walls et al. | |
| 2015/0341428 | A1* | 11/2015 | Chauhan | H04L 69/16 |
| | | | | 709/203 |
| 2016/0277235 | A1* | 9/2016 | Bhesania | H04L 41/0803 |
| 2018/0091626 | A1* | 3/2018 | Baldwin | H04L 67/34 |

OTHER PUBLICATIONS

IBM Knowledge Center, "Active file management architecture and terminology", printed from http://www.ibm.com/support/knowledgecenter/SSFKCN_3.5.0/com.ibm.cluster.gpfs.v3r5.gpfs200.doc/bl1adv_afmcachingterm.htm on Sep. 13, 2016.

IBM Knowledge Center, "Nodes in your GPFS cluster", printed from http://www.ibm.com/support/knowledgecenter/SSFKCN_3.5.0/com.ibm.cluster.gpfs.v3r5.gpfs300.doc/bl1ins_clnodes.htm on Sep. 13, 2016.

* cited by examiner

500 Node Details Table

| Node | Node Characteristics 514 |
|---|---|
| 512 | |
| 516 Node1 | Node1@Role = {Quorum: True, Token: False, Metadata: False, Server: True, Client: False, Admin: True} 518 |
| Node2 | Node2@Role = {Gateway: True, Replication: True, Token: False, Metadata: False, Server: True} |
| Node3 | Node3@Role = {Quorum: True, Replication: True, Token: False, Metadata: False, Admin: True} |
| ⋮ | ⋮ |
| 520 NodeN | NodeN@Role = {Quorum: True, Gateway: True, Replication: True, Server: True, Admin: True} |

FIG. 5

600 Operations Template

| Computation Operation Type 612 | Preferred File System Role 614 | Current Node(s) 616 |
|---|---|---|
| Image Processing | Token Manager | StorageNode8 |
| Archive/Backup | Replicator | ProxyNode1 |
| Real Time/Gaming | Wan Caching | StorageNode6 |
| Longer Execution | Redundant/Quorum | ProxyNode1 |
| Metadata | Metadata Manager | StorageNode6 |

FIG. 6

DYNAMICALLY TRANSITIONING THE FILE SYSTEM ROLE OF COMPUTE NODES FOR PROVISIONING A STORLET

BACKGROUND

1. Technical Field

This disclosure generally relates to computer storage systems, and more specifically relates to a system and method for dynamically transitioning the file system role of compute nodes for provisioning a storage object with an embedded compute engine or "storlet".

2. Background Art

Traditional computer file systems store information in a database such as in a tree structure. These traditional systems worked fine for small collections of data like those on a local hard drive, but they were not designed for the massive volumes of unstructured content like that used by many businesses that are collecting, storing, and accessing data locally and in the cloud. A newer method of storing information is called object storage. In this approach, information is stored as objects. Each object contains the data (the bits and bytes of our documents, movies, images, and so forth), together with metadata that holds user and system defined tags. The metadata describes the content of the data, how the object is related to other objects, how the data should be handled, replicated, or backed up, etc.

Another type of object storage was developed to increase the value of object storage and increase the speed at which the data in the objects can be accessed. This type of object storage has an embedded compute engine within the storage object and is typically called a "storlet". Thus a storlet is a data storage object with a computational component stored inside. A storlet allows object storage to move the ability to perform computations to the data, instead of the system having to move the data to a compute node or server to carry out the computation. The storlet can be provisioned or deployed on a compute node for execution by the compute node. When the storlet is executed, the efficiency of executing the storlet on the compute node depends on the type of operation the storlet performs and the capabilities and role of the compute node.

Storage systems may seek to use clustered file systems for object storage. This brings the advantages of a clustered file system such as backup, replication, consistency, locking, better metadata handling, etc. into the object storage architecture. However, problems arise when bringing storlet execution into a clustered file system that uses object storage. These problems include excessive communication between the nodes and excessive interlocking between the nodes in order to maintain consistency.

A clustered file system involves multiple nodes across a network. According to the distributed nature of its architecture, some of the nodes participating in the cluster would need to perform additional roles/functions (such as admin node, application node, client node, metadata node, token manager node, WAN caching gateway node, quorum node etc.). And by virtue of the roles performed by the node, some computation operations performed on these nodes are faster depending on the role performed by the node. For example, a storlet with a computational algorithm might involve repetitive operations on each object. In image processing each object may need to read/write multiple times at each pass. Each time the storlet container starts accessing the object, the node will request the token manager node to verify whether this object is locked by any other application or not. Thus this computation algorithm may generate a lot of token traffic between nodes where communication is required between the executing storlet and the node which handles token management for the storlet. In this example, if the storlet invocation containing this computational algorithm is made on a node other than a token manager node, it results in an excessive amount of communication (RPC calls) between the nodes.

Prior art storlet systems and architectures do not have the ability or intelligence to dynamically assign or change the filesystem role of a particular node to a role which is optimal for fulfilling a specific type of computation algorithm. Problems created by this lack of intelligence includes a tremendous increase in disk I/O operations, loading on the file system and degradation of storage unit performance and a reduced life span of disk drives.

BRIEF SUMMARY

A system and method dynamically transitions the file system role of compute nodes in a distributed clustered file system for an object that includes an embedded compute engine (a storlet). Embodiments of the invention overcome prior art problems of a storlet in a distributed storage system with a storlet engine having a dynamic role module which dynamically assigns or changes a file system role served by the node to a role which is more optimally suited for a computation operation in the storlet. The role assignment is made based on a classification of the computation operation and the appropriate filesystem role that matches computation operation. For example, a role could be assigned which helps reduce storage needs, communication resources, etc.

In an embodiment of the invention, a computer system comprises a processor coupled to a memory, a storlet with an embedded computation operation residing in the memory; a storlet engine with a dynamic role module executing on the processor, wherein the dynamic role module profiles the computation operation of the storlet to determine a computation type of the computation operation, determines a preferred role for the computation type, and where there is no node that has the preferred role with available resources the dynamic role module dynamically changes the role of a selected node that has available resources to the preferred role type of the computation operation where the preferred role type helps reduce storage needs, communication resources, etc. In an optional embodiment, the compute node is in a distributed clustered file system. In another optional embodiment, the storlet engine invokes the storlet in a virtual machine on the selected node. In another optional embodiment the virtual machine is a Docker container. Another optional embodiment further includes an operations template that is configurable by a user and contains a preferred role for a plurality of computational operation types, and wherein the dynamic role module dynamically changes the role of a selected node to the preferred role type of the computation operation based on the operations template, wherein the plurality of computation operation types comprise image processing, archive/backup, real time/gaming, longer execution and metadata. Another optional embodiment further comprises a detail collector on each of the nodes that collect the file system features and roles served by each node and a cluster wide scheduler that collects the file system features and roles from each of the nodes. Another optional embodiment further includes a node details table that contains the file system features and roles collected by the cluster wide scheduler wherein the dynamic role module reads the node details table to determine whether there is a node that has the preferred role.

A method embodiment of the invention includes receiving a first computation operation of a storlet; profiling the first computation operation according to one or more metrics to determine a computation operation type performed by the computation operation; performing a lookup operation based on the determined computation operation type to determine a preferred file system role; and where there is no node with available resources of the preferred role dynamically changing the role of a selected node to the preferred role type of the computation operation.

Another method embodiment of the invention includes receiving a first computation operation of a storlet; profiling the first computation operation according to one or more metrics to determine a computation operation type performed by the computation operation; performing a lookup operation based on the determined computation operation type to determine a preferred file system role by utilizing an operations template that is configurable by a user and contains preferred file system roles for a plurality of computational operation types; where there is no node with available resources of the preferred file system role then dynamically changing the role of a selected node to the preferred file system role of the computation operation using the operations template to determine there is no node with the preferred file system role with available resources; and invoking the storlet in a virtual machine on the selected node.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 depicts a node details table containing characteristics of nodes used for an example of dynamically transitioning the file system role of compute nodes;

FIG. 6 depicts an operations template containing operations information for nodes used for an example of dynamically transitioning the file system role of compute nodes;

Figure 4:
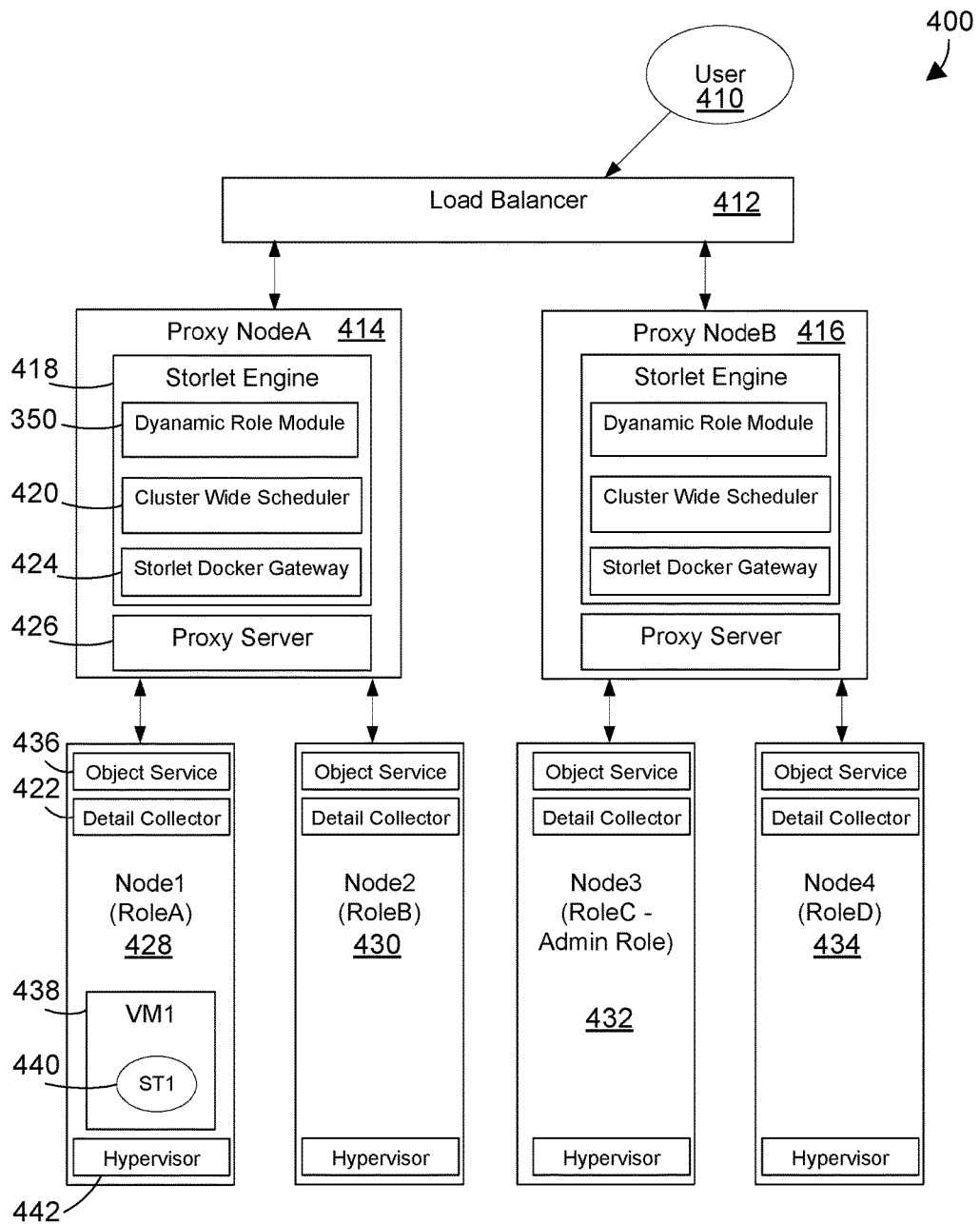
FIG. 4 is a block diagram of computer system with a dynamic role module as described herein for dynamically transitioning the file system role of compute nodes.
Figure 7:
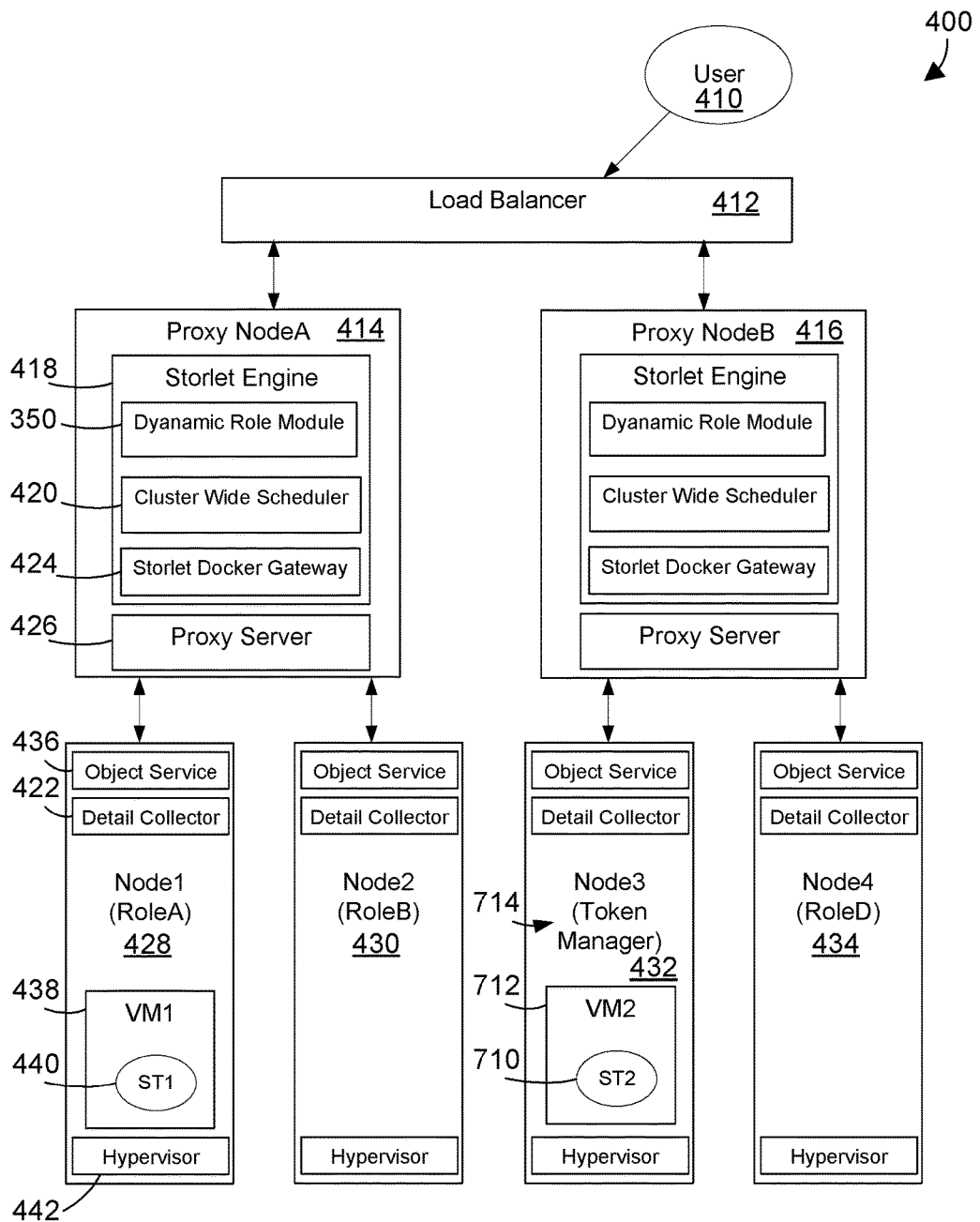
Figure 8:
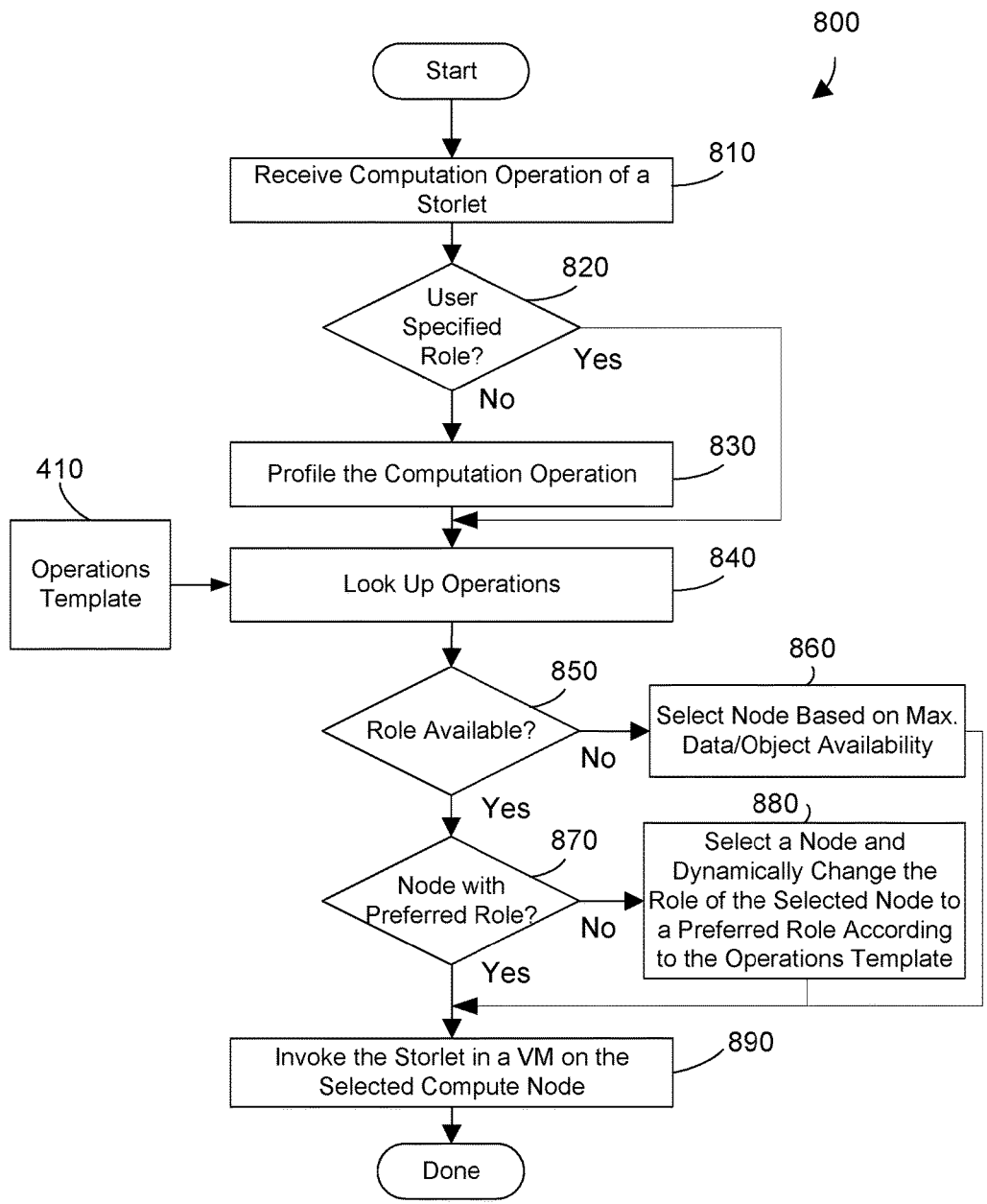
Figure 9:
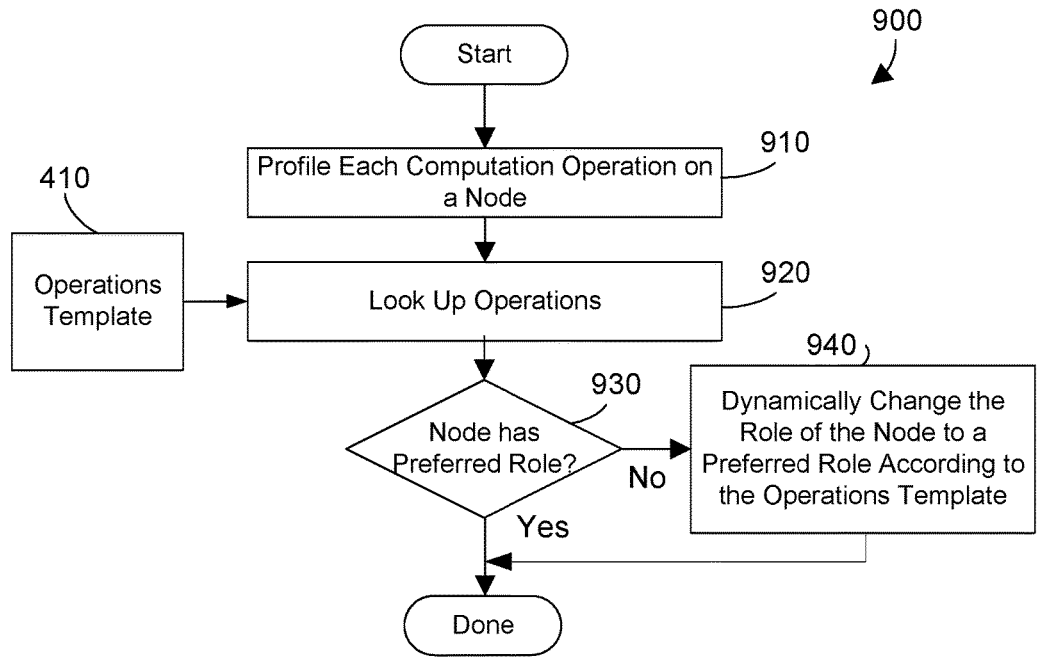
Figure 10:
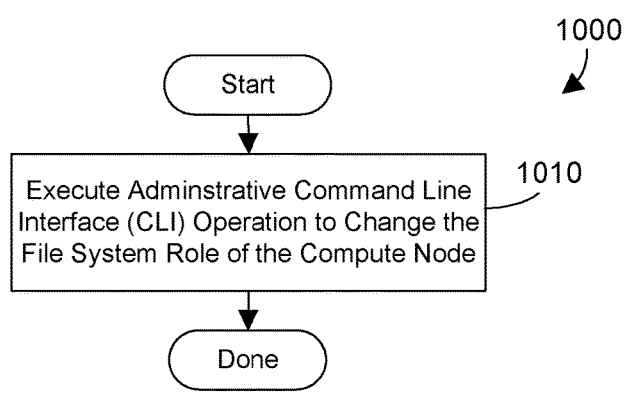

FIG. 7 further illustrates the block diagram of FIG. 4 after dynamically transitioning the file system role of node 3;

FIG. 8 is a flow diagram of a method for dynamically transitioning the file system role of compute nodes as described herein;

FIG. 9 is a flow diagram of another method for dynamically transitioning the file system role of compute nodes as described herein; and FIG. 10 is a flow diagram of a specific method for step 880 in FIG. 8 and step 940 in FIG. 9.

DETAILED DESCRIPTION

The disclosure and claims herein relate to system and method dynamically transitions the file system role of compute nodes in a distributed clustered file system for an object that includes an embedded compute engine (a storlet).

Embodiments of the invention overcome prior art problems of a storlet in a distributed storage system with a storlet engine having a dynamic role module which dynamically assigns or changes a file system role served by the node to a role which is more optimally suited for a computation operation in the storlet. The role assignment is made based on a classification of the computation operation and the appropriate filesystem role that matches computation operation. For example, a role could be assigned which helps reduce storage needs, communication resources, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
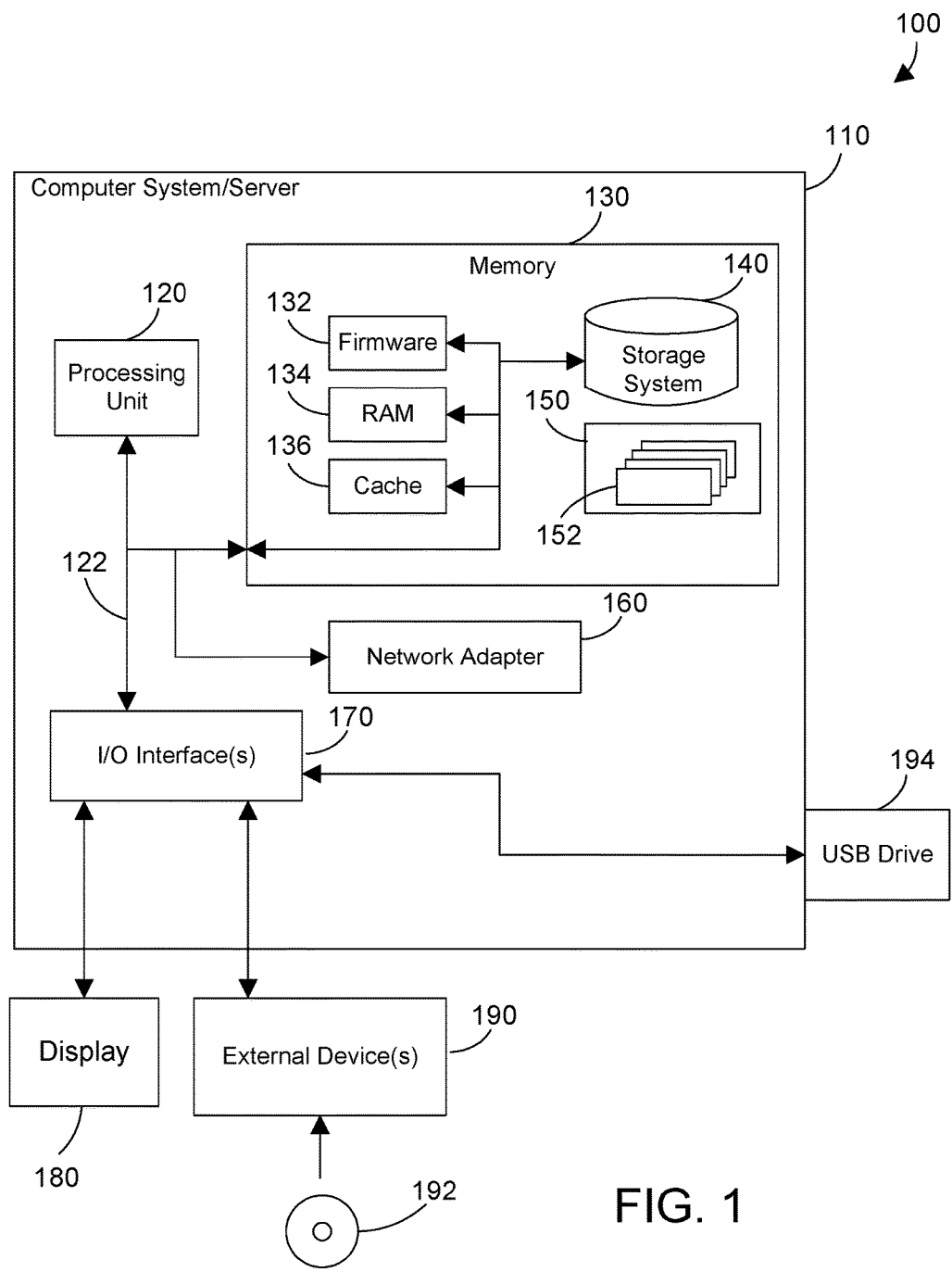
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
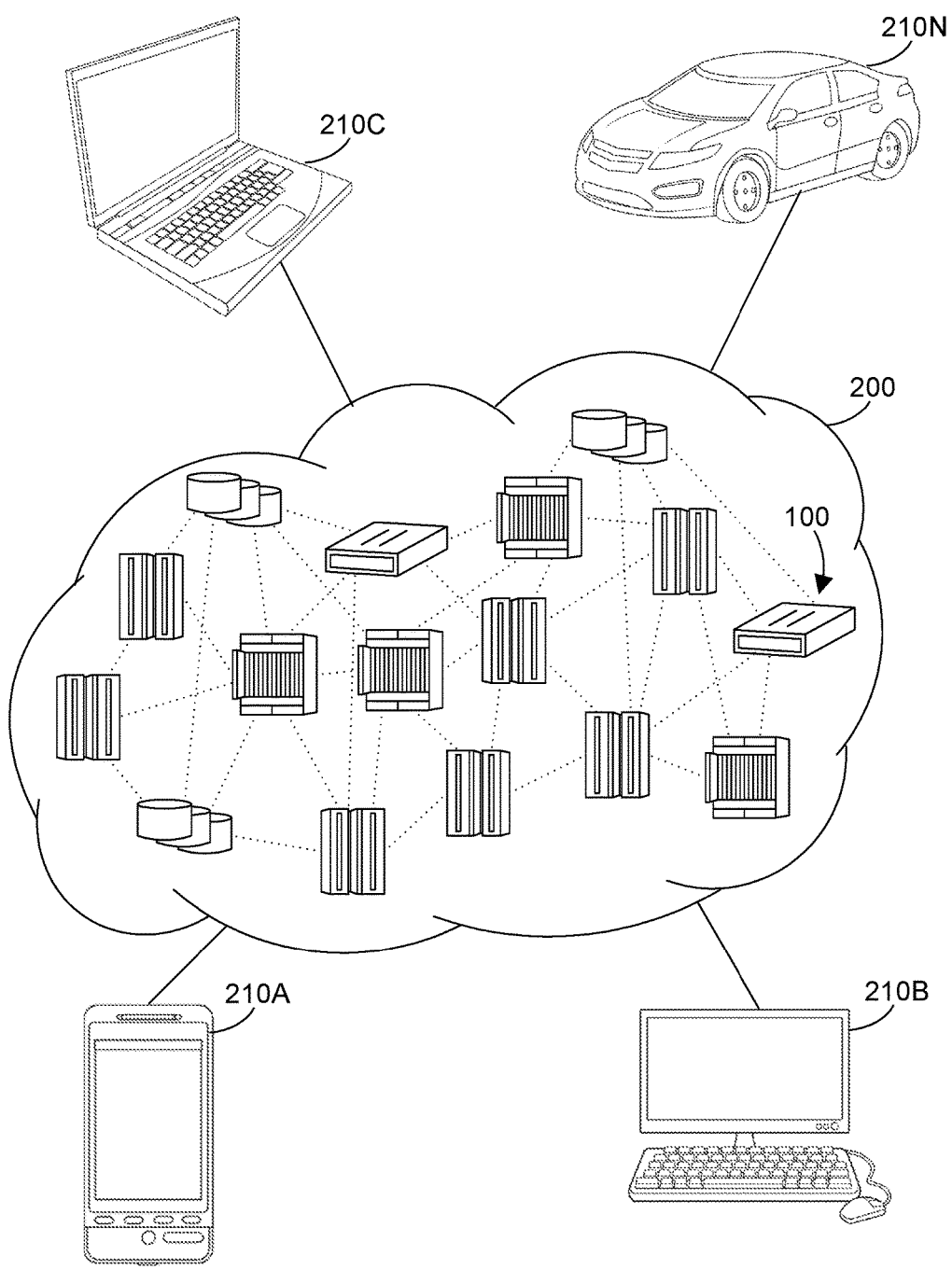
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
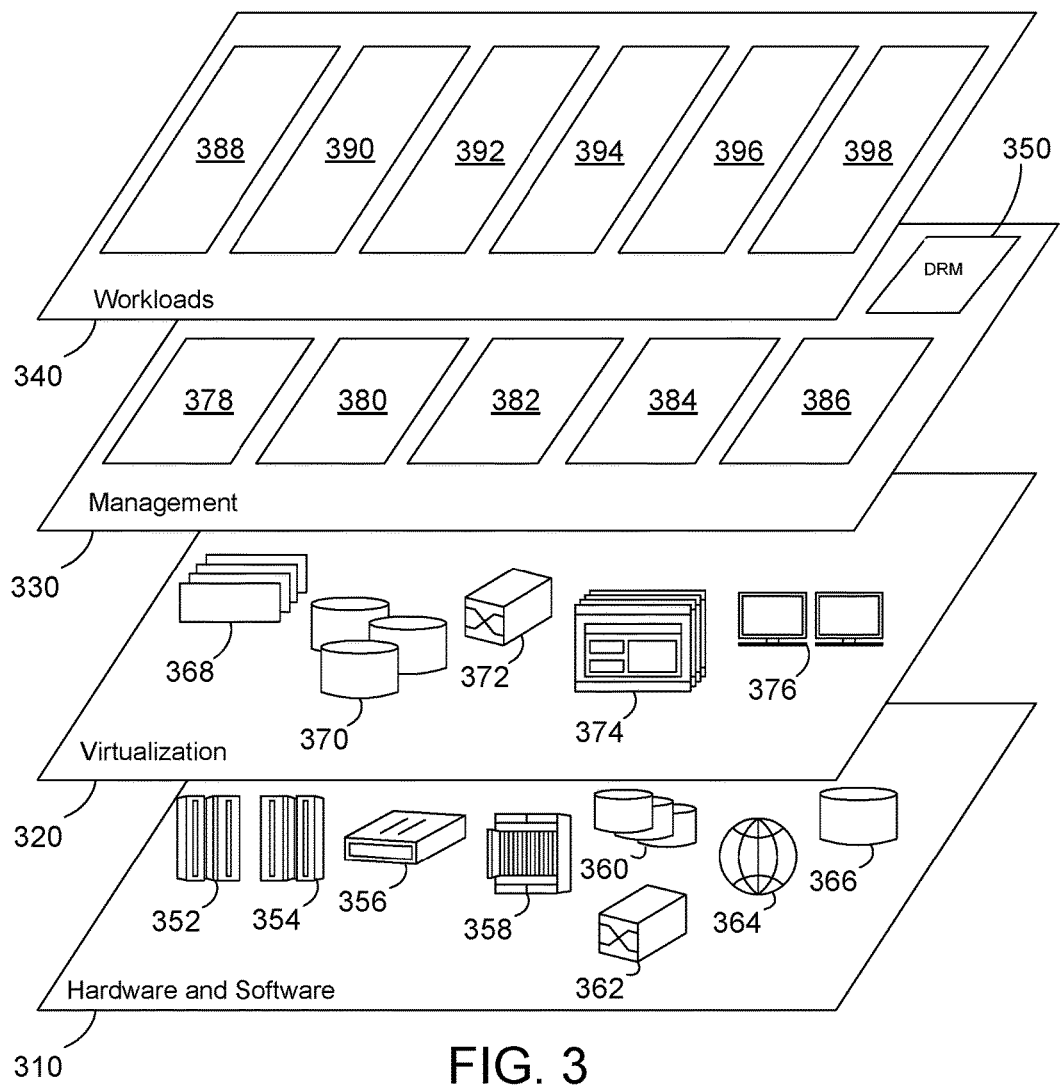
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a dynamic role module (DRM) 350 as described herein. While the DRM 350 is shown in FIG. 3 to reside in the management layer 330, the DRM 350 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

The dynamic role module 350 shown in FIG. 3 and as described herein may be incorporated in a storlet architecture or storlet system as known in the prior art. The storlet system may include a storlet engine to access one or more storlets to increase the efficiency of the system to access and use data objects. A storlet may be a computation module that may be uploaded dynamically, e.g., the storlet may be transferred to a storage node from another node without interrupting an ongoing process. A storlet may include embedded computing infrastructure within an object storage environment. A storlet may also serve to offload data-intensive computations to where data is stored, instead of data being processed in a single location. A storlet may run within a storage unit or medium, proximate to various data. A storlet may be viewed as an analog to stored procedures in databases. A storlet may add flexibility to the storage, and may make the storage extensible, effectively making the storage a platform, according to various embodiments. In other words, using a storlet engine, a storage system is transformed from merely keeping data, to producing value from the data. A storlet engine may run one or more storlets, and may operate in conjunction with various other software.

The storlet system may include a storlet engine operating within one or more various nodes. An end user may frame a computation operation and deploy or pass it to the storlet engine as a typical object storage request (e.g., "PUT") operation. A storlet-configured object storage may not require any additional client or a compute node to perform analysis of the data, thus the storage or proxy nodes may act as compute nodes and may return results to the user. Various architectures may use virtual machines (VMs), but the architectures may also or instead use Linux containers, Docker containers, etc. deployed on the nodes in order to perform various computation tasks or operations. A Docker container is an open source container format defined by Docker Incorporated. A storlet may be composed of or utilize Linux containers and/or additional middleware. The examples described herein use virtual machines.

An example object storage architecture may utilize two types of compute nodes (also referred to as entities). One node type called "proxy" nodes may be used for distributed load handling and request handling nodes into a namespace. Another node type may be called "storage" nodes. Storage nodes are responsible for writing to the various storage subsystems (e.g., disks). Storage nodes may serve as a storage unit or repository, and may assist in analysis, including extracting information from raw data of the data residing in these storage subsystems. Traditionally the architecture would utilize an additional client or node in order to compute data.

In a clustered file system such as General Parallel File System (GPFS) by International Business Machines Corporation, there may be one or more nodes that provide tokens to the rest of a cluster. These nodes are called token managers. A token may be a single element of a programming language. For example, a token could be a keyword, an operator, or a punctuation mark. For example, in networking, a token may be a particular series of bits that travels around a token-ring network. As the token circulates, computers attached to the network can capture it. In this sense, a token may act as a ticket, enabling an owner to send a message across the network. There may be only one token for each network, so there would be no possibility that two computers will attempt to transmit messages at the same time. Token Managers may be selected from nodes previously designated as managers. The token manager nodes may be responsible for tracking all of the tokens in the cluster.

Within a clustered file system, a cluster with one or more cache file-sets may utilize a gateway node, which may act as a network file system (NFS) client to fetch data in parallel from home, and may have multiple application nodes, which may service application data requests). On the application nodes, data requests may be handled locally if the requested data is cached. Otherwise, the data requests may be forwarded on to gateway nodes, which may use an NFS client to handle the request.

A split between application and gateway nodes may be conceptual, and any node in the cache cluster may function as either a gateway node or an application node based on its configuration. Gateway nodes may be viewed as the edge of the cache cluster that may communicate with a home cluster, while the application nodes may interface with the application. Application nodes may communicate with each other via internal remote procedure call (RPC) requests.

Client nodes may permit or facilitate an exchange of data between virtual servers that locally mount a clustered file system. Virtual servers may include or encompass various VMs and/or containers or other virtualization units. Other exports of the data may or may not be permitted, according to various embodiments. The client node may or may not be used for virtual servers to share clustered file system data directly through any application, service, protocol or method, such as NFS, common internet file system (CIFS), file transfer protocol (FTP), or hypertext transfer protocol (HTTP). For various functions, a clustered file system server license may be required or requested, according to various embodiments.

An administration (admin) node may be used by various administration commands to communicate between nodes. A metadata node may be a node that handles metadata, also referred to as "directory block updates." An application node may mount a clustered file system and may run an application (e.g., of a user), which may access the file system.

A clustered file system may include multiple nodes across a network and according to the distributed nature of its architecture, and some of the nodes participating in the cluster may need to perform additional roles or functions (e.g., admin node, application node, client node, metadata node, token manager node, WAN caching gateway node, quorum node, etc., as outlined herein). By virtue of the roles performed by the node, some computation operations performed on these nodes may prove to be faster, as opposed to executing computation operations inefficiently with in view of roles performed by the node.

FIG. 4 depicts a block diagram of an example object storage system 400 that dynamically transitions the file system role of a compute node. The storlet system 400 includes a storlet engine 418 on a proxy node 414 with a dynamic role module 350 as introduced with reference to FIG. 3 above. The storlet engine 418 may operate similar to a prior art storlet engine but also includes the additional features described herein. The dynamic role module 350 in conjunction with the storlet engine 418 dynamically transitions the file system role of a compute node and provisions a storlet on a node based on the computation operation of the storlet as described herein. The storlet system 400 may include a load balancer 412 that receives input from a user 410. The load balancer may balance workloads across various nodes such that each node is less likely to be over-utilized or underutilized. The load balancer 412 may communicate with the storlet engine 418 to balance loads in the system. The storlet engine 418 may further include a cluster wide scheduler 420. The cluster wide scheduler 420 is a service or daemon that is distributed across all proxy nodes and is responsible for collecting the role/filesystem features information exported from each object storage node by the detail collector 422 described below. The storlet engine 418 may further include a storlet docker gateway 424 that communicates with one or more compute engines or virtual machines (VMs). The storlet docker gateway 424 passes data to the VM to be processed and gets a result back from the VM. As used herein, a virtual machine (VM) may be a traditional VM or may include a docker based compute engine which is responsible for hosting and isolating the execution of the storlet. The proxy node 414 may further include a proxy server 426. The proxy server 426 is an application server which performs request handling. For each request, it will look up the location of object (may be stored in an object placement data structure not shown) and route the request accordingly.

Again referring to FIG. 4, the storlet engine 418 determines on which node to invoke storlets. As used herein, invoking a storlet on a node may include provisioning a virtual machine on the node along with passing the storlet storlet to the virtual machine and executing the storlet. The storlet engine 418 communicates with an object service module 436 on a node and provisions storlets on the VMs on the nodes. In the illustrated example there are four nodes, node1 428, node2 430, node3 432, and node4 434. Node1 428 has an object service module 436, a detail collector 422 (described further below) and a hypervisor 442. The other nodes 430, 432, 434 may have similar components as shown. The storlet engine in conjunction with the dynamic role module 350 may provision or invoke storlets on one or more nodes 428, 430, 432, 434 based on the computation operations and the file system role served by the nodes to reduce unnecessary communication between nodes and reduce load on the system. In the illustrated example, a first virtual machine VM1 438 has been provisioned on node1 428. VM1 438 has a storlet ST1 440. Various data or operations may also be stored on various nodes, e.g., a storage node. Further, other various operations may be executed on the various nodes, e.g., using a VM.

Again referring to FIG. 4, a detail collector 422 located on each node participating in the object storage cluster may collect the file system features, roles, and/or tasks served by each node. The detail collector 422 may export the collected details from each node to the cluster wide storlet scheduler 420 and placed in a node details table as described below.

The detail collector 422 may be a daemon or background process that periodically or continuously collects the data as shown below and described with reference to FIG. 5. The dynamic role module 350 may use these details to identify the underlying file system roles served by the nodes (e.g., proxy or storage nodes) as described below.

FIG. 5 depicts an example of a node details table 500. The nodes details table 500 may be used by the dynamic role module 350 described above to store information for dynamically transitioning the file system role of compute nodes. The node details table 500 contains characteristics of nodes participating in the cluster. The detail collector 422 may collect and/or compile underlying file system features, roles, and/or tasks served by each node. This data may be stored in a node details table 500 as shown. The specific data shown in the node details table 500 in FIG. 5 is used for an example described herein with regards to FIGS. 4 through 7. In the illustrated example, the node details table 500 includes a node number in the left column 512 with node characteristics 514 listed for the respective nodes. Alternatively, the node number may be any appropriate node identifier. Features, roles, and/or tasks may be displayed or stored in the node characteristics 514. In this example, node1 516 includes the following node characteristics "Node1@Role={Quorum: True, Token: False, Metadata: False, Server: True, Client: False, Admin: True}" 518. This data indicates that node1 516 has the roles of Quorum, Server and Admin. Respective information may be appended or included for any number of nodes, up to an $N^{th}$ node 520. Each node may have node characteristics 514 similar to node1 516.

A clustered filesystem may have many nodes, as many as a thousand nodes or more. The filesystem chooses nodes for storing cluster information and assigns responsibilities the selected nodes. Each filesystem role can be served by one or more nodes. For example, the management role may be assigned only to one node, where the token manager role may be assigned to multiple nodes. Different types of computation operations will execute more efficiently on a node with a particular assigned role. For example, an image processing operation is a computation operation that when executed may involve repetitive operations on each object where each object need to read/write multiple times at each pass. This computation operation will likely generate a large amount of token traffic since each time the storlet starts accessing objects of the image processing operation, the node will pass the request the token manager node to verify whether this object is locked by any other application. Thus an image processing operation will more efficiently execute on a node having a token manager role. Other processing operations similarly have a preferred role. For example, storlet computation operation types and the corresponding preferred file system roles may be as follows:

Image processing->Token manager;
Achieve/Backup operations->replication manager;
Long running operations->Quorum manager;
Gaming/real time operations->WAN caching gateway; and
Metadata operations->Metadata manager.

FIG. 6 depicts an example of an operations template 600. The relationship between the computation operation types and preferred roles may be provided by the user and stored in the operations template 600 as shown. The operations template 600 may be used by the dynamic role module 350 for assigning roles to nodes as described herein. The operations template 600 may include various categories, such as computation operation type 612, preferred file system role 614 for the corresponding computation operation 610, and current node(s) 616 serving the respective role. The computation operation type 612 describes the type of computation operation that a storlet may perform. In the illustrated example, the possible computation operation types 612 include image processing, archive/backup, real time/gaming, longer execution and metadata. The longer execution type means that the computation operation requires significant time and computer resources to execute. The metadata type computation algorithm refers to metadata operations such as modifying metadata in bulk (example: appending a new metadata field to all files stored in a particular namespace). The dynamic role module 350 may keep track of the file system role performed by each node and the deployed computation operation category. Based on these parameters, the dynamic role module 350 may determine the appropriate node to be selected for processing the deployed computation operation in consideration of available resources. Where a node with the preferred file system role is not available, the dynamic role module 350 may dynamically reassign a node to new system role for a node as described herein.

The file system role of a node can be changed where needed as described herein. The file system role can be changed using file system administration commands or by using file system programming guides/API's. The dynamic role module 350 may determine the current filesystem role served by the selected node, for example, by a query operation or by consulting the template of FIG. 6. If the file system role needed by the storlet is found to be a different role than the node's current role, the dynamic role module 350 may execute administration CLI's (command Line Interface) to change the role. The following pseudo code provides an example, for using a File System Command Line Interface to effect the changes.

FSCLI node <nodename>--query role (returns o/p) management role
FSCLI node <nodename>--change_role 'token mgr' (returns o/p) token manager A user may deploy a storlet with a computation operation. The storlet engine may then parse the computation operation for syntax errors. The storlet engine may then determine the type, nature, and/or characteristics of the computation operation. For example, the computation operation may be arithmetic, or any specialized operation, such as conversion from .TXT to .PDF, editing JPG, etc. The dynamic role module engine may then determine a node to be used for provisioning or instantiating a virtualization unit (virtual machine) to execute the storlet. The storlet engine may then pass the storlet to the provisioned virtual machine. The virtual machine may then pull, read, or write data, based on the steps defined in the computation operation. The storlet may then return to the user code, which may indicate a success or failure, and/or results.

The dynamic role module 350 and the storlet engine 422 may estimate a file system role appropriate for a computation operation of a storlet. This estimation may be based on the type of the operations encapsulated in the computation operation. This estimation may also be auto learning enabled, and an end user may have the ability to determine the role required, via metadata or an extended attribute of the computation operation object. The storlet engine 422 may also enable the detail collector to scan for underlying file system features, roles, and/or tasks served by each node and reported to a cluster wide scheduler within the storlet engine 422 as described above.

Based on the identified preferred file system role determined by the storlet engine and/or the dynamic role module, the dynamic role module may perform a lookup operation against the operations template 600 shown in FIG. 6. The operations template 600 may be updated dynamically, automatically, and/or by an administrator. If the appropriate file system role is found available among the reported nodes, then based on available resources the storlet engine may determine a node to be used for executing this particular computation operation (storlet). Where an appropriate file system role is not found, the dynamic role module dynamically changes the file system role of a node to accommodate the computation operation in the storlet as described herein.

An example of dynamically transitioning the file system role of a compute node will now be described with reference to FIG. 4, FIG. 6 and FIG. 7. In this example, we assume a user has previously provided a first storlet ST1 440 that was provisioned in VM1 438 on node1 428 as shown in FIG. 4. Later, the user or software provides a second storlet (ST2 710) to be provisioned on the system. We assume for this example that the user did not specify a role for this storlet ST2. The storlet ST2 is profiled by the dynamic role module to determine the type of computation operation in the storlet. In this example, the second storlet is determined to have an image processing operation. The dynamic role module in the storlet engine consults the operation template 600 in FIG. 6 and determines that the needed role for this computation operation is token manager and is available since it appears in the operation template. If the role were not available the storlet would simply be placed on a node based on availability as done in the prior art. In this example, the token manager role is available on StorageNode8 shown in FIG. 6, but we assume for this example StorageNode8 shown in FIG. 6 does not have available resources. Since there are no matching nodes (nodes with token manager role) with available resources, the dynamic role module may then determine to place the storlet on node3 432 shown in FIG. 6 on the basis of maximum available free resources. Since node3 432 in FIG. 6 currently has the "admin role" and not the preferred token manager role, the dynamic role module 350 changes the filesystem role to "token manager" since the token manager role is an appropriate role for this computation operation. A virtual machine VM2 712 is deployed and then the storlet ST2 710 is then invoked on VM2 712 on the selected node (node3 432). FIG. 7 illustrates the block diagram of FIG. 4 after dynamically transitioning the file system role of node 3 to token manager 714.

In the examples described above, changing of the file system role was performed by the dynamic role module 350. Alternatively, a portion of the above functionality to dynamically change the role of the selected node may be incorporated in a portion of the object service in the node or within a script of the computation operation within the storlet. All the storlet (or container or docker or VM) images deployed on the nodes have an input and output stream, using which they communicate to the user end. The computation operation along with the identified appropriate role can be sent to the input stream of identified appropriate node (node selection is based on maximum amount of free resources). The script deployed inside the storlet image, may then perform a query operation of the current filesystem role served by the selected node and if found a different role, executes the administration CLI's (command Line Interface) to change the role as described above.

Referring to FIG. 8, a method 800 shows one suitable example for assigning virtual machines to nodes and dynamically transitioning the file system role of a compute node and provisioning a storlet on a node based on the computation operation of the storlet. Portions of method 800 are preferably performed by the dynamic role module 350 shown in FIG. 3, and the storlet engine 418 in FIG. 4. First, receive a computation operation of a storlet (step 810). Next, determine if there is a user specified role for the storlet (step 820). If there is a user specified role (step 820=yes) then go to step 840. If there is not a user specified role (step 820=no) then profile the computation operation to determine a computation operation type (step 830). Look up the determined computation operation type in the operations template 410 (step 840). Determine if a node is available with the preferred file system role for the determined computation operation type (step 850). If no node is available with the preferred role (step 850=no) then invoke the storlet to any available node based on maximum data/object availability (step 860). If a node is available with the preferred role (step 850=yes) then determine if there is a node with the preferred file system role corresponding to the computation operation of the storlet with available resources (step 870). If there is no node with the needed file system role that has available resources (step 870=no) then select a node with available resources and dynamically change the role of the selected node to the preferred role to suit the computation operation of the storlet (step 880) and then invoke the storlet on the selected node (step 890). If there is a node with the preferred file system role with available resources (step 870=yes) then invoke the storlet on the selected node with the preferred system role (step 890). Method 800 is then done.

Referring to FIG. 9, a method 900 shows another suitable example for assigning virtual machines to nodes and dynamically transitioning the file system role of a compute node and provisioning a storlet on a node based on the computation operation of the storlet. Portions of method 900 are preferably performed by the dynamic role module 350 shown in FIG. 3, and the storlet engine 418 in FIG. 4. In this method it is assumed that the storlets have already been invoked on a node and the dynamic role module determines whether the computation operations on the node indicate a different preferred role and then dynamically changing the role of the node to the preferred role of one or more computation operations. First, profile the computation operation to determine a computation operation type (step 910). Look up the determined computation operation type in the operations template 410 (step 920). Determine if the node has the preferred file system role for the determined computation operation type (step 930. If the node has the preferred role (step 930=yes) then the method is done. If the node does not have the preferred role (step 930=no) then dynamically change the role of the selected node to the preferred role to suit the computation operation of the storlet (step 940). Method 900 is then done.

FIG. 10 shows one suitable example of a method 1000 for dynamically transitioning the file system role of a compute node. Method 1000 thus shows a suitable method for performing step 880 in method 800 or step 940 in method 900. Execute an administrative command line interface operation to change the file system role of the compute node (step 910). The method is then done.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims herein relate system and method for dynamically transitioning the file system role of compute nodes in a distributed clustered file system for an object that includes an embedded compute engine (a storlet) to reduce storage needs and communication resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
    a processor coupled to a memory,
    a storlet with an embedded computation operation residing in the memory;
    a plurality of compute nodes each having a role;
    a storlet engine with a dynamic role module executing on the processor, wherein the dynamic role module profiles the computation operation of the storlet to determine a computation type of the computation operation, determines a preferred role for the computation type, and where there is no compute node that has the preferred role with available resources the dynamic role module dynamically changes the role of a selected compute node of the plurality of compute nodes that has available resources to the preferred role type of the computation operation;
    an operations template that is configurable by a user and contains a preferred role for a plurality of computational operation types, and wherein the dynamic role module dynamically changes the role of a selected compute node to the preferred role type of the computation operation based on the operations template; and
    wherein the plurality of computation operation types comprise image processing, archive/backup, real time/gaming, longer execution and metadata.

2. The computer system of claim 1, wherein the selected compute node is in a distributed clustered file system.

3. The computer system of claim 1, wherein the storlet engine invokes the storlet in a virtual machine on the selected compute node.

4. The computer system of claim 3, wherein the virtual machine is a Docker container.

5. The computer system of claim 1, further comprising a detail collector on each of the nodes that collect the file system features and roles served by each node.

6. The computer system of claim 5, further comprising a cluster wide scheduler that collects the file system features and roles from each of the plurality of compute nodes.

7. The computer system of claim 6 further comprising a node details table that contains the file system features and roles collected by the cluster wide scheduler, wherein the dynamic role module reads the node details table to determine whether there is a compute node that has the preferred role.

8. A method for adjusting roles of nodes in a distributed clustered file system, comprising:
    providing a plurality of compute nodes each having a role;
    receiving a first computation operation of a storlet;
    profiling the first computation operation to determine a computation operation type performed by the computation operation;
    performing a lookup operation based on the determined computation operation type to determine a preferred file system role by utilizing an operations template that is configurable by a user and contains preferred file system roles for a plurality of computational operation types;
    determining from the determined computation operation type a preferred file system role; and
    where there is no compute node with available resources of the preferred file system role then dynamically changing the role of a selected compute node of the plurality of compute nodes to the preferred role type of the computation operation using the operations template to determine there is no compute node with the preferred file system role with available resources; and
    wherein the plurality of computation operation types comprise image processing, archive/backup, real time/gaming, longer execution and metadata.

9. The method of claim 8, further comprising invoking the storlet in a virtual machine on the selected compute node.

10. The method of claim 9, wherein the virtual machine is a docker container.

11. The method of claim 8, further comprising collecting compute node details on each compute node, where the compute node details include file system features and roles served by each compute node.

12. The method of claim 11, further comprising collecting the file system features and roles collected on each of the compute nodes.

13. The method of claim 11 further comprising storing the file system features and roles of the plurality of compute nodes in a nodes detail table.

14. The method of claim 8 wherein a user specifies a preferred role for the computation operation.

15. A method for adjusting roles of nodes in a distributed clustered file system, comprising:
    providing a plurality of compute nodes each having a role;
    receiving a first computation operation of a storlet;
    profiling the first computation operation according to one or more metrics to determine a computation operation type performed by the computation operation;
    performing a lookup operation based on the determined computation operation type to determine a preferred file system role by utilizing an operations template that is configurable by a user and contains preferred file system roles for a plurality of computational operation types;
    where there is no compute node with available resources of the preferred file system role then dynamically changing the role of a selected compute node of the plurality of compute nodes to the preferred file system role of the computation operation using the operations template to determine there is no compute node with the preferred file system role with available resources;
    wherein the selected node is changed to a role chosen from: token manager, replicator, wan caching, redundant/quorum and metadata manager; and
    invoking the storlet in a virtual machine on the selected node.

16. The method of claim 15, wherein a user specifies a preferred role for the computation operation.

17. A computer system comprising:
    a processor coupled to a memory,
    an operations template in the memory that is configurable by a user and contains a preferred role for a plurality of computational operation types;
    a detail collector on each of a plurality of compute nodes that collect file system features and roles served by the plurality of compute nodes;
    a cluster wide scheduler that collects the file system features and roles from each of the plurality of compute nodes;
    a node details table that contains the file system features and roles collected by the cluster wide scheduler;
    a storlet with an embedded computation operation residing in the memory;
    a storlet engine with a dynamic role module executing on the processor, wherein the dynamic role module profiles the computation operation of the storlet to determine a computation type of the computation operation, determines a preferred role for the computation type from the node details table, and where there is no compute node that has the preferred role with available resources the dynamic role module dynamically changes the role of a selected compute node that has available resources to the preferred role type of the computation operation based on the operations template;

wherein the storlet engine invokes the storlet in a virtual machine on the selected node;

wherein the selected compute node is in a distributed clustered file system;

wherein the plurality of computation operation types comprises image processing, archive/backup, real time/gaming, longer execution and metadata.

18. The computer system of claim 17, wherein the virtual machine is a docker container.

* * * * *